TIMING PULSE GENERATOR

Filed April 29, 1960 2 Sheets-Sheet 1

INVENTOR.
CHARLES. A. KINGSFORD-SMITH
BY Edward A. Robinson
ATTORNEY

INVENTOR.
CHARLES. A. KINGSFORD-SMITH
BY Edward A. Robinson
ATTORNEY

United States Patent Office 3,164,818
Patented Jan. 5, 1965

3,164,818
TIMING PULSE GENERATOR

Charles A. Kingsford-Smith, Menlo Park, Calif., assignor to General Precision, Inc., Binghamton, N.Y., a corporation of Delaware Filed Apr. 29, 1960, Ser. No. 25,690
14 Claims. (Cl. 340—174.1)

Figure 1:
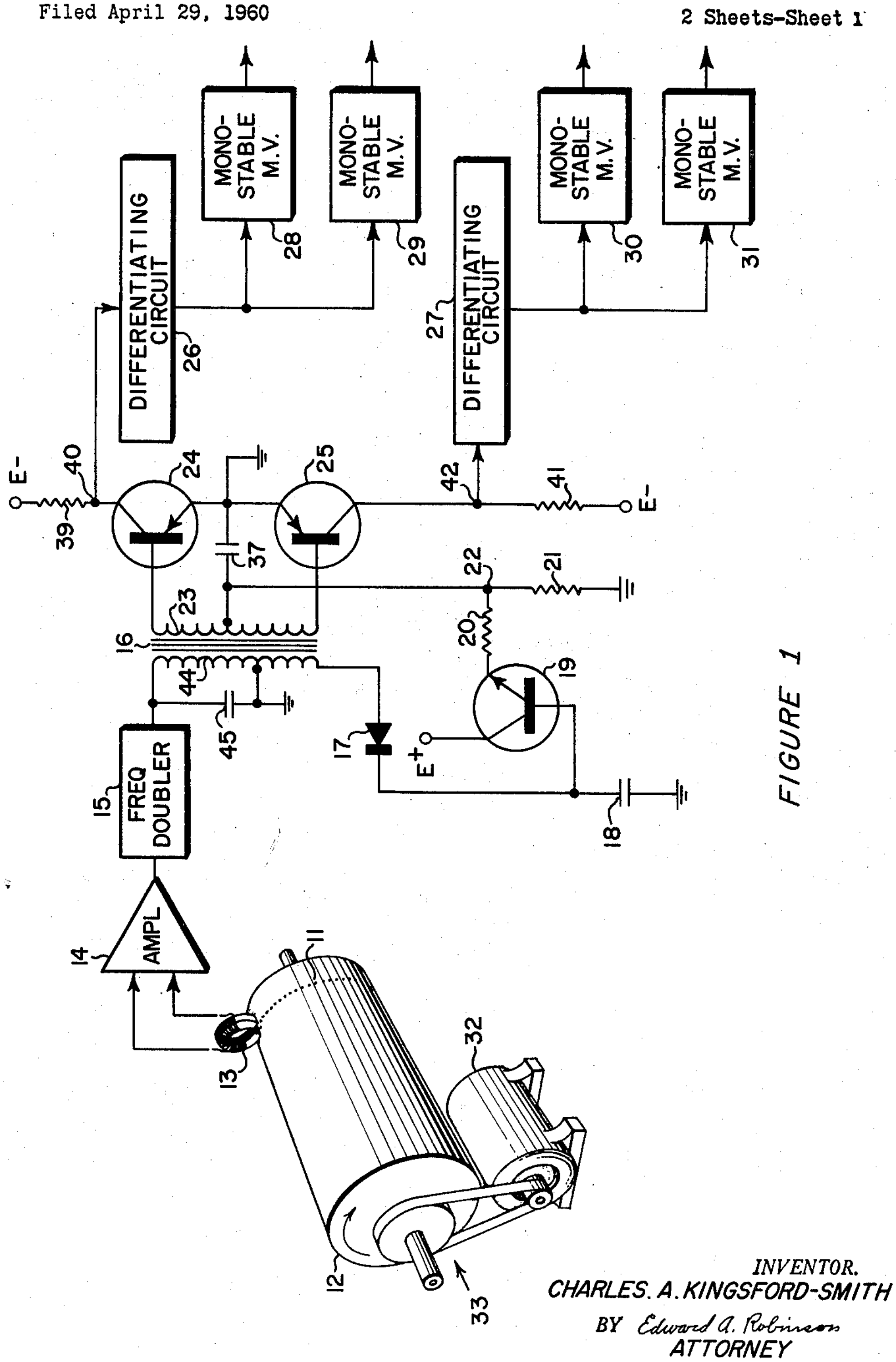

This invention relates to circuits for generating timing or clock pulses, and more particularly to a circuit for generating timing pulses synchronous with an alternating wave which may be derived from a clock track on a moving magnetic recording surface.

Information in the form of "bits" of data may be recorded on a moving magnetic surface such as a tape, disk or drum by a transducer positioned to magnetically coact with the moving surface. The bit recording and reproducing circuits associated with the transducer must operate in synchronism with the movement of the surface to permit orderly recording from which the information may be reproduced. If a rotating drum is used for data recording, a clock track may be provided in addition to information or data tracks. In such a system, a transducer may sense a permanently recorded magnetic pattern of the clock track to generate a fluctuating or alternating signal, the frequency of which is established by the rotational speed of the drum and the corresponding linear speed of the clock track. The data bits may be generated as pulses synchronized with the signal derived from the clock track and selectively gated and passed to another transducer which would record the bits at precise angular positions with respect to the clock track. Similarly the timed pulses may be used to control other circuits in the reproduction of previously recorded data bits.

In magnetic recording, it may be desirable to increase the pulse rate with respect to the wave induced by the clock track in the associated transducer; and more specifically, it is desirable that trains of pulses be available which have various phase relationships with the wave. This could make possible an increased bit density of the recorded data and a corresponding increase in the information that could be recorded on a unit area of the drum; or alternatively, the variations in pulse timing may be useful to trigger gating circuits slightly in advance of "read" times or "write" times when bits of data may be reproduced and/or recorded during the bit intervals.

In a clocking system wherein the timing of pulses must be synchronized with an alternating current wave, it is important that variation in the amplitude of the wave have no effect upon the timing. It is likewise important thta in the event that the wave varies in frequency, such as would occur should the drum speed vary, the pulse trains likewise vary in frequency and remain synchronized with the wave; and that the several pulse trains maintain their respective phase relationships with the wave, and that the relative timing between the pulses of the different trains remain the same.

It is an object of this invention to provide an improved method and means for generating timing pulses which are synchronous with an alternating curent wave; and more specifically, it is an object to provide such an arrangement for generating pulses which will remain synchronous and of the same phase relationship with the alternating current wave even though the wave may vary somewhat in frequency and amplitude.

A further object of this invention is to provide an improved circuit for generating multiple pulses synchronous with the cycles of an alternating current wave, and more specifically to provide an arrangement for generating four timing pulses equally spaced along each cycle of the wave, such that pulses will be available having different phase relationships with the alternating wave.

Figure 2:
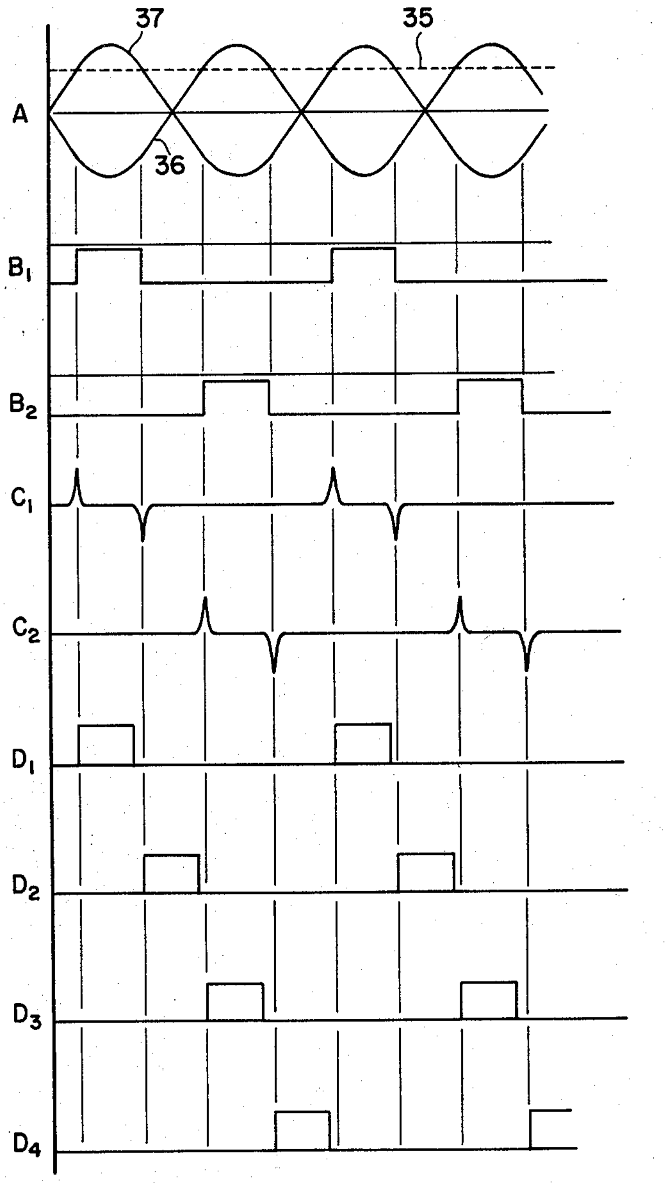

A more complete understanding of the present invention, its mode of operation and its advantages, may be gathered from further reading of this specification, together with an inspection of the accompanying drawings in which:

FIGURE 1 is a diagram of a circuit for generating the timing pulses in accordance with this invention; and FIGURE 2 is a graphical representation of the timing wave and various pulses derived therefrom.

Briefly stated, according to a preferred embodiment of this invention, an alternating wave is derived from a clock track 11 on a rotating magnetic drum 12 by a transducer 13, an amplifying circuit 14, and a frequency doubler circuit 15, and this wave is impressed upon a transformer 16. The alternating wave is rectified by a diode 17 and a direct current voltage corresponding to the amplitude of the wave is stored in a capacitor 18. A transistor 19, connected as an emitter follower is provided with two load resistors 20 and 21 connected in series for developing a voltage at a point 22 which is a predetermined fraction of the amplitude of the alternating current wave. The direct voltage of the point 22 is combined with the alternating wave induced in the secondary winding 23 of the transformer 16 and the combined voltages are impressed upon transistors 24 and 25. The transistors 24 and 25 are normally non-conductive but biased into conduction alternately at intervals during alternate half cycles of the wave. Differentiating circuits 26 and 27 will produce sharp pulses or spikes of opposite polarities as the respective transistors 24 and 25 begin and terminate their conduction intervals. The pulses generated by the differentiating circuits 26 and 27 are synchronous with the alternating wave and may be utilized directly to clock recording apparatus; however, a better arrangement is to couple mono-stable multivibrator circuits 28, 29, 30 and 31 as pulse generating circuits which are triggered by the sharp pulses from the differentiating circuits 26 and 27.

As indicated in FIGURE 1, the drum 12 may be rotated by a drive means such as a motor 32. Should the drive motor 32 be of the induction type, or should it be coupled to the drum by a mechanical means such as a belt and pulley arrangement 33 as indicated, the drum 12 may be subject to slippage and variations in speed of rotation. Such speed variations may cause corresponding variations in the frequency and amplitude of the alternating current wave impressed upon the transformer 16. Since the diode 17 effectively senses the peak or maximum value of the voltage wave, a variation in the amplitude of the wave will cause a corresponding variation or adjustment of the peak voltage level stored in the capacitor 18. The emitter follower 19 is biased by the level of voltage of the capacitor 18 and therefore, the voltage across the load resistors 20 and 21 will correspond to the peak value of the wave as represented by the charge on the capacitor. The D.C. voltage level at the point 22 will assume a predetermined fractional portion of the amplitude of the wave applied to the transformer 16, and as that amplitude varies the D.C. voltage will likewise vary, tending to maintain the output clock pulses at the same frequency and spacing even though the input has varied.

FIGURE 2 illustrates the alternating current wave as it is induced in the secondary winding 23 of the transformer 16. A D.C. level 35 was generated at the series connection point 22 as previously indicated and applied to the midpoint of the secondary winding 23. The A.C. wave induced by the upper half of the winding 23 is illustrated by a curve 36, while the corresponding wave 37 is induced in the lower half of the winding 23 and is 180° out of phase with the wave 36. The D.C. bias 35 is combined with the respective waves 36 and 37, and the combined signal is applied to bias the respective transistors 24 and 25. Since the emitter electrode of these transistors 24 and 25 is at ground potential, the bias voltage applied to the base electrode will render the transistors cut-off or non-conductive until the combined voltage drops to a negative value—less than ground potential. It will therefore be appreciated, that the D.C. bias derived from point 22 tends to hold the transistors 24 and 25 non-conductive and these transistors will conduct only during the negative half cycles of the A.C. wave and then only during those intervals when the instantaneous value of the wave exceeds the bias level 35. The curves $B_1$ and $B_2$ illustrate the conductive characteristics of the transistors 24 and 25. When the A.C. wave 36 exceeds and overcomes the D.C. bias 35, the transistor 24 will be driven into saturation, and the current therethrough will be limited only by a load resistor 39, so that the voltage appearing at an output point 40 will appear as a rectangular wave shown as $B_1$ in FIGURE 2. Similarly, the transistor 25 will conduct during the opposite half cycles of the A.C. wave, and its current flow will be limited only by a load resistor 41, whereby the rectangular wave $B_2$ (FIG. 2) will appear at an output point 42.

The rectangular wave $B_1$ is differentiated by the circuit 26 to produce a curve of positive- and negative-going spikes or sharp pulses. The other differentiating circuit 27 will receive the rectangular wave $B_2$ to produce similar positive and negative spikes shown as the curve $C_2$ in FIGURE 2. A book entitled "Vacuum Tube Circuits" by Lawrence Baker Arguimbau published by John Wiley and Sons, New York, New York, shows a differentiating circuit, and a method of differentiating a square wave on pages 538 and 539. Such circuits and methods could be used as the blocks 26 and 27.

The mono-stable multivibrators 28 through 31 are coupled to receive the differentiated spikes from the differentiating circuits 26 and 27. The spikes are used to trigger the mono-stable multivibrators 28 through 31 which may be of the type disclosed in chapter 6 of "Pulse and Digital Circuits" by Jacob Millman and Herbert Taub published in 1956 by McGraw-Hill Company, New York, New York. Each of the multivibrators 28 through 31, when triggered by an appropriate spike pulse, will produce a shaped square wave pulse of a predetermined duration. The multivibrator 28 is coupled to the differentiating circuit 26 and will be triggered by the positive-going pulses of the curve $C_1$ to thereby produce the output pulses of the curve $D_1$. The mono-stable multivibrator circuit 29 is likewise coupled to the differentiating circuit 26 but is responsive to negative-going pulses therefrom and thereby produces output pulses according to the curve $D_2$. Thus, from an example from FIGURE 2 it may be seen that each positive spike of the curve $C_1$ initiates a longer pulse on the curve $D_1$ and each negative spike of the curve $C_1$ will initiate a corresponding pulse on the curve $D_2$. Similarly the mono-stable multivibrator circuits 30 and 31 are triggered by the respective positive and negative going spikes from the differentiating circuit 27.

In summary, the conduction intervals of the transistors 24 and 25 are determined by the instantaneous value of the alternate half-cycles of the alternating wave 36 and 37 as compared with the direct current bias level 35. The beginning and the termination of each conduction interval is thereby timed by the alternating wave itself, and will produce the sharp spikes $C_1$ and $C_2$ which are likewise timed in accordance with the wave. The mono-stable multivibrator circuits 28 through 31 will generate the pulse wave form $D_1$, $D_2$, $D_3$, and $D_4$ which is initiated by the timed spikes $C_1$ and $C_2$. Therefore, the pulses $D_1$ through $D_4$ are timed in accordance with the phase relationship of the alternating wave from the transformer 16.

As previously stated the direct voltage level 35 is generated by sensing the peak or maximum value of the alternating wave, and therefore, this level will be maintained at a predetermined fraction or ratio of the amplitude of the wave. If the amplitude of the wave varies the D.C. level 35 will likewise vary proportionately, and the conduction intervals of the transistors 24 and 25 will maintain their relative timing with the phase of the A.C. wave. Obviously, the conduction intervals of the transistors 24 and 25 are timed by the phase relation of the alternate half cycles, and these conduction intervals will remain synchronized with the wave even though the wave may vary somewhat in frequency.

The frequency doubler circuit 15 may comprise, for example, a full wave rectifier followed by an appropriate tuned filter to generate a wave of twice the original frequency. Thus, if the transducer 13 and amplifier 14 produced a first alternating wave, the frequency doubler 15, acting as a full wave rectifier, would produce a double frequency pulsating current. The band pass filter may include a portion of the primary winding 44 of the transformer 16 shunted by an appropriate capacitor 45. The frequency doubler circuit 15 in combination with the subsequent circuitry constitutes a means for dividing the timing wave derived from the clock track 11 into four equally spaced time intervals. Obviously, the timing wave could be further divided to provide additional gating pulses during each single cycle or half cycle thereof.

While the foregoing description and accompanying drawings discloses an arrangement for producing the D.C. bias including a pair of series connected ratio resistors 20 and 21, in other embodiments the appropriate ratio between the direct current level 35 and the alternating waves 36 and 37 may be obtained by selectively winding the transformer 16. Thus, for example, the voltage stored by the capacitor 18 is derived from the primary winding of the transformer 16. If the secondary winding thereof had a proportionate increase in turns, then the proper ratio could be attained to permit a direct comparison of the voltage from the capacitor 18 and the induced voltages from the secondary winding of the transformer 16 without the use of of the ratio resistors 20 and 21.

I claim:

1. A method for generating timed pulses which are synchronous with an alternating current wave, said method comprising the steps of sensing the peak value of the wave, establishing a signal level which is a predetermined fraction of the peak value of the wave, and comparing the wave with the established signal level to generate pulses when the wave corresponds with the signal level.

2. A method for generating timed pulses which are synchronous with an alternating current wave, said method comprising the steps of sensing the peak value of the wave, establishing a direct current voltage which bears a predetermined ratio to the peak value of the wave, comparing the wave with the direct current voltage and generating a pulse when the instantaneous value of the wave corresponds to the direct current voltage.

3. A method for generating timing pulses which are synchronous with an alternating current wave, said method comprising the steps of sensing the peak value of the wave, establishing a direct current voltage which bears a predetermined ratio with the peak value of the wave, comparing the wave with the direct current voltage and generating a pulse at each time that the instantaneous value of the wave equals the direct current voltage.

4. A method for generating timing pulses which are synchronous with an alternating wave, said method comprising the steps of sensing the peak value of the wave and storing a voltage corresponding thereto, proportionally dividing the stored voltage to establish a direct current voltage, combining the direct current voltage with the alternating current wave, and generating a pulse when the combination of direct current voltage and alternating current wave equals a reference potential.

5. Apparatus for generating timed pulses synchronous with an alternating current wave, said apparatus comprising a means responsively coupled to the wave and operable to generate a direct current voltage having a value of a predetermined ratio to the amplitude of the wave, a controllable conduction device, biasing means coupled to the controllable conduction device, said biasing means being coupled to receive and combine the alternating current wave and the direct current voltage, said controllable conduction device being operable to change state of conduction when the instantaneous value of the alternating current wave equals the direct current voltage.

6. Apparatus for generating timed pulses synchronous with an alternating current wave, said apparatus comprising a means responsively coupled to the wave and operable to generate a direct current voltage having a value of a predetermined ratio to the amplitude of the wave, a controllable conduction device biasing means responsively coupled to the controllable conduction device, said biasing means being coupled to receive and combine the alternating current wave and the direct current voltage, said controllable conduction device being operable to assume a first conduction state when the instantaneous value of the wave exceeds the direct current voltage and being further operable to assume an opposite conduction state when the direct current voltage is less than the instananeous value of the wave, a differentiating means coupled to the controllable conduction device and operable to generate a pulse when the controllable conduction device changes its state of conduction.

7. Apparatus for generating timed pulses synchronous with an alternating current wave, said apparatus comprising a storage means coupled to the alternating current wave and operable to sense and store the maximum value of the wave, ratio means coupled to the storage means and operable to establish a signal level which is a predetermined fraction of the maximum value of the alternating current wave, and a controlled conduction means biasing means coupled to the controllable conduction means, said biasing means being coupled to receive and combine the alternating current wave and the signal level from the ratio means, said controlled conduction means being operable to generate the timed pulse when the value of the alternating current wave corresponds to the signal level established by the ratio means.

8. Apparatus for generating timed pulses synchronous with an alternating current wave, said apparatus comprising means responsively coupled to the wave and operable to generate a direct voltage having a value of a predetermined ratio to the amplitude of the wave, a biasing means for combining the wave with the direct current voltage and a pair of controllable conduction devices responsively coupled to the biasing means, a first of the controllable conduction devices being rendered conductive during a half cycle of the wave when the instantaneous value thereof exceeds the direct voltage, the second of the controllable conduction devices being rendered conductive during the next succeeding half cycle of the wave when the instantaneous value thereof exceeds the direct voltage.

9. Apparatus for generating timed pulses synchronous with an alternating current wave, said apparatus comprising means responsively coupled to the wave and operable to generate a direct voltage having a value of a predetermined ratio to the amplitude of the wave, a pair of controllable conduction devices responsively coupled to the alternating current wave and to the direct voltage, a first of the controllable conduction devices being rendered conductive during an interval of a half cycle of the wave when the instantaneous value thereof exceeds the direct voltage, the second of the controllable conduction devices being rendered conductive during an interval of the next succeeding half cycle of the wave when the instantaneous value thereof exceeds the direct voltage, and differentiating means coupled to each of the controllable conduction devices and operable to generate pulses at the beginning and at the end of the conduction interval of the associated controllable conduction devices.

10. Apparatus for generating timed pulses synchronous with an alternating current wave, said apparatus comprising means responsively coupled to the wave and operable to generate a direct current voltage having a value of a predetermined ratio to the amplitude of the wave, a pair of transistors coupled to the alternating current wave and to the direct current voltage, a first of the transistors being rendered conductive during an interval of a half cycle of the wave when the instantaneous value thereof exceeds the direct current voltage, the second transistor being rendered conductive during an interval of the next succeeding half cycle of the wave when the instantaneous value thereof exceeds the direct current voltage, differentiating means coupled to each of the transistors and operable to generate a pulse of a first polarity at the beginning of the conduction interval of the associated transistor and operable to generate a pulse of the opposite polarity at the termination of the conduction interval, and a plurality of mono-stable multivibrators coupled to the differentiating means and each operable to generate a pulse of a predetermined duration when a pulse of proper polarity is impressed thereon by the differentiating means.

11. Apparatus for generating timed pulses synchronous with an alternating current wave, said apparatus comprising means responsively coupled to the wave and operable to generate a direct current voltage having a value of a predetermined ratio to the amplitude of the wave, a pair of transistors coupled to the alternating current wave and to the direct current voltage, a first of the transistors being rendered conductive during an interval of a half cycle of the wave when the instantaneous value thereof exceeds the direct current voltage, the second transistor being rendered conductive during an interval of the next succeeding half cycle of the wave when the instantaneous value thereof exceeds the direct current voltage, a differentiating circuit coupled to each of the transistors and operable to generate pulses of opposite polarity respectively at the beginning and termination of the conduction interval of the associated transistor, and a pair of monostable multivibrators coupled to each of the differentiating circuits, a first of the multivibrators being operable to generate a timed pulse when triggered by a pulse of a first polarity from the differentiating circuit and the second of the multivibrators being operable to generate another timed pulse when triggered by a pulse of the opposite polarity from the differentiating circuit whereby four timed pulses are generated in quadrature with respect to the alternating current wave.

12. Apparatus for recording and reproducing data comprising a movable magnetic surface having a clock track recorded thereon, a transducer positioned adjacent to the surface and magnetically co-acting with the clock track for generating a first alternating wave having a frequency determined by the speed of the surface, a frequency multiplier circuit coupled to the transducer and operable to generate a second alternating wave having a frequency which is multiple of the first alternating wave, a means responsively coupled to the second wave for generating a direct voltage having a value of a pre-determined ratio to the amplitude of the second wave, a pair of controllable conduction devices responsively coupled to the second alternating wave and to the direct voltage, a first of the controllable conduction devices being rendered conductive during a first half cycle when the instantaneous value thereof exceeds the direct voltage, the second of the controllable conduction devices being rendered conductive during the next succeeding half cycle of the wave when the instantaneous value thereof exceeds the direct voltage.

13. Apparatus for recording and reproducing data comprising a rotatable magnetic drum having a clock track recorded thereon, a transducer positioned adjacent to the drum and magnetically co-acting with the clock track for generating a first alternating wave having a frequency determined by the rotation of the drum, a frequency multiplier circuit coupled to the transducer and operable to generate a second alternating wave having a frequency which is a multiple of the first alternating wave, a means responsively coupled to the second wave for generating a direct voltage having a value of a predetermined ratio to the amplitude of the second wave, a pair of controllable conduction devices responsively coupled to the second alternating wave and to the direct voltage, a first of the controllable conduction devices being rendered conductive during a first half cycle when the instantaneous value thereof exceeds the direct voltage, the second of the controllable conduction devices being rendered conductive during the next succeeding half cycle of the wave when the instantaneous value thereof exceeds the direct voltage, and a differentiating means coupled to each of the controllable conduction devices and operable to generate pulses at the beginning and at the end of the conduction interval of the associated controllable conduction devices.

14. Apparatus for recording and reproducing data comprising a rotatable magnetic drum having a clock track recorded thereon, a transducer positioned adjacent to the drum and magnetically co-acting with the clock track for generating a first alternating wave having a frequency determined by the rotation of the drum, a frequency doubler circuit coupled to the transducer and operable to generate a second alternating wave having twice the frequency of the first alternating wave, a means responsively coupled to the second wave for generating a direct voltage having a value of a predetermined ratio to the amplitude of the second wave, a pair of controllable conduction devices responsively coupled to the second alternating wave and to the direct voltage, a first of the controllable conduction devices being rendered conductive during a first half cycle when the instantaneous value thereof exceeds the direct voltage, the second of the controllable conduction devices being rendered conductive during the next succeeding half cycle of the wave when the instantaneous value thereof exceeds the direct voltage, a differentiating means coupled to each of the controllable conduction devices and operable to generate pulses at the beginning and at the end of the conduction interval of the associated controllable conduction devices, and a plurality of mono-stable multivibrators coupled to the differentating means and each operable to generate a pulse of a predetermined duration when a pulse of proper polarity is impressed thereon by the differentiating means.

References Cited in the file of this patent

UNITED STATES PATENTS

| | | |
|---|---|---|
| 2,201,022 | Bartels | May 14, 1940 |
| 2,432,878 | Frederick | Dec. 16, 1947 |
| 2,692,306 | Hathaway | Oct. 19, 1954 |
| 2,834,883 | Lukoff | May 13, 1958 |
| 2,840,726 | Hamilton | June 24, 1958 |
| 2,886,802 | Henning | May 12, 1959 |